United States Patent
Yugou et al.

(10) Patent No.: US 8,575,940 B2
(45) Date of Patent: Nov. 5, 2013

(54) POWER SUPPLY DEVICE AND METHOD FOR DETECTING NON-CONTACT STATE OF LOAD CONNECTED TO POWER SUPPLY DEVICE

(75) Inventors: Masaki Yugou, Kakogawa (JP); Yutaka Yamauchi, Himeji (JP)

(73) Assignee: Sanyo Electric Co., Ltd., Osaka (JP)

( * ) Notice: Subject to any disclaimer, the term of this patent is extended or adjusted under 35 U.S.C. 154(b) by 351 days.

(21) Appl. No.: 13/035,143

(22) Filed: Feb. 25, 2011

(65) Prior Publication Data
US 2011/0210746 A1   Sep. 1, 2011

(30) Foreign Application Priority Data
Feb. 26, 2010   (JP) ................................. 2010-043132

(51) Int. Cl.
- *G01N 27/416* (2006.01)
- *B60L 1/00* (2006.01)
- *H02J 3/00* (2006.01)

(52) U.S. Cl.
USPC ............. 324/427; 307/9.1; 307/10.1; 307/26; 307/34; 307/85; 307/86

(58) Field of Classification Search
USPC ........... 324/427; 307/9.1, 10.1, 26, 34, 85, 86
See application file for complete search history.

(56) References Cited

U.S. PATENT DOCUMENTS

| | | | | |
|---|---|---|---|---|
| 5,780,980 A * | 7/1998 | Naito | ............................. | 318/139 |
| 6,157,165 A * | 12/2000 | Kinoshita et al. | ............. | 320/116 |
| 7,768,237 B2 * | 8/2010 | Tarchinski | ..................... | 320/135 |
| 7,952,236 B2 * | 5/2011 | Mitsutani | ...................... | 307/117 |
| 2003/0042866 A1 * | 3/2003 | Minamiura et al. | .......... | 320/104 |
| 2003/0155810 A1 * | 8/2003 | Mizuta et al. | ................. | 307/10.1 |
| 2007/0221627 A1 * | 9/2007 | Yugou et al. | ................... | 218/136 |
| 2009/0258282 A1 * | 10/2009 | Harada et al. | ................... | 429/61 |
| 2010/0001582 A1 * | 1/2010 | Newhouse et al. | ........... | 307/10.1 |
| 2010/0001693 A1 * | 1/2010 | Iida et al. | ....................... | 320/134 |

FOREIGN PATENT DOCUMENTS

JP   2006-216516   8/2006

* cited by examiner

*Primary Examiner* — M'Baye Diao
(74) *Attorney, Agent, or Firm* — Wenderoth, Lind & Ponack, L.L.P.

(57) ABSTRACT

A power supply device includes a battery, positive and negative-side contactors and a controller. The battery supplies power to a load. The positive-side contactor is serially connected to the positive side of the battery, and the negative-side contactor is serially connected to the negative side of the battery. The controller determines whether the load connected to the output sides of the positive-side contactor and the negative-side contactor is in a connected or non-contact state. The controller includes a voltage detecting circuit that detects the capacitor voltage of a capacitor connected to the output sides of the positive-side contactor and the negative-side contactor, and a determination circuit that compares the detected voltage with a predetermined voltage and determines the connected state of the load.

10 Claims, 8 Drawing Sheets

POWER SUPPLY DEVICE AND METHOD FOR DETECTING NON-CONTACT STATE OF LOAD CONNECTED TO POWER SUPPLY DEVICE

BACKGROUND OF THE INVENTION

1. Field of the Invention

The present invention relates to a power supply device that is installed on a hybrid car, electric vehicle or fuel-cell vehicle and supplies electric power to a driving electric motor for running the vehicle, and a method for detecting the non-contact state of a load connected to a power supply device.

2. Description of the Related Art

A power supply device has been developed that includes a contactor on the output side through which a load is connected to the power supply device (see Japanese Patent Laid-Open Publication No. 2006-216516).

The load connected to this power supply device is a DC/AC inverter. A large-capacitance capacitor is connected in parallel to the input side of the DC/AC inverter. A driving electric motor and an electric generator are connected to the output side of the DC/AC inverter. In the case where this power supply device is connected to the load, when an ignition switch as main switch of a vehicle is turned ON, the contactor is turned ON (closed) so that electric power is provided to the load. When the ignition switch is turned OFF, the contactor is turned OFF so that output voltage is cut off.

In order to determine whether the load is properly connected or is in a non-contact state, the known power supply device includes a connection detecting plug that is constructed integrally with a connector that connects the load to the power supply device so that the connection state of the connector can be detected. The integrally-constructed connection detecting plug is simultaneously connected to the power supply device when the connector is connected to the power supply device. Accordingly, the power supply device can detect that the connection detecting plug is connected, and as a result can detect that the load is detected. The connection detecting plug includes a short circuit that short-circuits a pair of contacts, for example. This type of connection detecting plug short-circuits the contacts that connect the connection detecting plug in the case where the connector is connected, and opens the contacts in the case where the connector is not connected. Accordingly, the power supply device can detect whether a short circuit is established by the connection detecting plug, and as a result can determine whether the connector of the load is connected.

In the thus-constructed power supply device, since the connector necessarily includes the connection detecting plug for detecting the connection state of the load, there is a problem that the construction of the connector becomes complicated. On the other hand, in the case of construction that the load is fastened without using the connector by fastening screws or the like, there is a problem that it is impossible to distinguish whether the connection state or the non-contact state of the load.

The present invention is devised to solve the above problems. It is a primal object to provide a power supply device that is simply constructed without providing a connector with a connection detecting plug for connecting a load or without using a connector but capable of distinguishing whether the connection state or the non-contact state of the load with the load being directly connected to the power supply device.

SUMMARY OF THE INVENTION

To achieve the above object, a power supply device according to a first aspect of the present invention includes a battery, a positive terminal contactor, a negative terminal contactor, and a control portion. The battery includes rechargeable battery cells and supplies electric power to a load. The positive terminal contactor is serially connected to the positive side of the battery. The negative terminal contactor is serially connected to the negative side of the battery. The control portion determines whether the load connected to the output sides of the positive terminal contactor and the negative terminal contactor is in a connected state or a non-contact state. The control portion includes a voltage detecting circuit, and a determination circuit. The voltage detecting circuit detects the capacitor voltage of a capacitor that is connected to the output sides of the positive terminal contactor and the negative terminal contactor. The determination circuit compares the capacitor voltage detected by the voltage detecting circuit with a predetermined voltage, and determines the connected state of the load. According to this construction, when the power supply device is connected to a load, without using specially-designed circuits such as a connector including a connection detecting plug, the determination circuit compares the capacitor voltage detected by the voltage detecting circuit with a predetermined voltage, and can determine the connected state of the load. Therefore, this power supply device has an advantage that a load can be directly connected to the power supply device.

In a power supply device according to a second aspect of the present invention, the control portion includes a contactor controlling circuit that controls opening/closing of the negative terminal contactor. The voltage detecting circuit detects the capacitor voltage with the negative terminal contactor being closed by the contactor controlling circuit. When the capacitor voltage is not smaller than the predetermined voltage the determination circuit determines that the load is in the connected state. According to this construction, since, when the capacitor voltage is detected with the negative terminal contactor being closed, if this capacitor voltage is detected, it can be determined that the capacitor stores electric charge, in other words, that the power supply device is connected to the capacitor. Therefore, it is possible to easily determine the connected state.

In a power supply device according to a third aspect of the present invention, the predetermined voltage is a voltage value not less than 50% of the battery voltage of the battery. According to this construction, if it is determined that a large amount of electric charge is stored in the capacitor, it is possible to directly determine that the load is properly connected to the power supply device. Conversely, if the amount of electric charge stored in the capacitor is small, it is possible to determine that the load is in the non-contact state or that the electric charge is discharged.

In a power supply device according to a fourth aspect of the present invention, the power supply device further includes a precharge circuit that is connected in parallel to the positive terminal contactor and includes a series circuit of a precharge resistance and a precharge relay. The control portion includes a relay controlling circuit that controls the precharge relay of the precharge circuit. When the determination circuit determines that the load is in the non-contact state based on detection of the capacitor voltage by the voltage detecting circuit, the relay controlling circuit turns the precharge relay ON, and then the voltage detecting circuit detects increase of the capacitor voltage so that the determination circuit determines, based on the detected increase of the capacitor voltage, whether the load is in the connected state or the non-contact state. According to this construction, if the increase of the capacitor voltage is large, it can be determined that the load is in the non-contact state, conversely if small, it can be determined that the load is in the connected state.

In a power supply device according to a fifth aspect of the present invention, the power supply device further includes a current detecting circuit that detects the current flowing through the battery. When the current detected by the current detecting circuit is not greater than a predetermined threshold current, the determination circuit determines that the load is in the non-contact state. According to this construction, if the current value is small, it can be determined that the load is opened, that is, in the non-contact state.

In a power supply device according to a sixth aspect of the present invention, the determination circuit conducts a plurality of determination operations for determining whether the load is in the connected state or the non-contact state periodically at a predetermined period of time, wherein if it is determined continuously for a predetermined number of times that the load is in the non-contact state it is concluded that the load is in the non-contact state. According to this construction, it is possible to reduce false detection, and to highly reliably detect the non-contact state.

In a power supply device according to a seventh aspect of the present invention, the voltage detecting circuit detects the capacitor voltage when a predetermined period of time has elapsed after the precharge relay is turned ON. The determination circuit compares the capacitor voltage detected by the voltage detecting circuit with a second predetermined voltage and determines whether the load is in the connected state or the non-contact state. According to this construction, it is possible to distinguish whether the non-contact state of the load or the state where the electric charge of the capacitor is discharged.

In a power supply device according to an eighth aspect of the present invention, a predetermined voltage range as the second predetermined voltage has upper and lower limit values. When the capacitor voltage detected by the voltage detecting circuit falls within the range between the upper and lower limit values, the determination circuit determines that the load is in the non-contact state. According to this construction, since a predetermined voltage range having upper and lower limit values is employed as the second predetermined voltage, it is possible to more provide reliable determination.

In a power supply device according to a ninth aspect of the present invention, the voltage detecting circuit also serves as a circuit that detects the voltages of battery cells of the battery. According to this construction, since the voltage detecting circuit for battery cells can be used also to detect the connected state of the load, the power supply device has an advantage that the circuitry can be further simplified by this construction in addition to by eliminating a connector including a connection detecting plug, or the like.

In a method according to an eleventh aspect of the present invention is a method for detecting the non-contact state of a load connected to a power supply device. In this method, the capacitor voltage of a capacitor is detected by a voltage detecting circuit. The capacitor is connected to the output sides of a positive terminal contactor and a negative terminal contactor. The positive and negative terminal contactors are the positive and negative sides of a battery, respectively. The battery includes rechargeable battery cells for supplying electric power to a load. Increase of the capacitor voltage is detected by the voltage detecting circuit. It is determined that the load is in the non-contact state by a determination circuit for determining the connected state of the load if the detection voltage detected by the voltage detecting circuit is lower than a predetermined voltage and the increase of the capacitor voltage falls within a predetermined range. According to this construction, since, without using specially-designed circuits such as a connector including a connection detecting plug, the connected state between the power supply device and the load can be reliably determined, this method has an advantage that the load can be directly connected to the power supply device.

In a method for detecting the non-contact state of a load connected to a power supply device according to a twelfth aspect of the present, an ignition switch ON is turned ON before the capacitor voltage of a capacitor is detected. According to this construction, when the ignition key is turned ON, the non-contact state such as disconnection of the load can be detected. Therefore, safety can be ensured.

The above and further objects of the present invention as well as the features thereof will become more apparent from the following detailed description to be made in conjunction with the accompanying drawings.

DETAILED DESCRIPTION OF THE INVENTION

The following description will describe embodiments according to the present invention with reference to the drawings.

Figure 1:
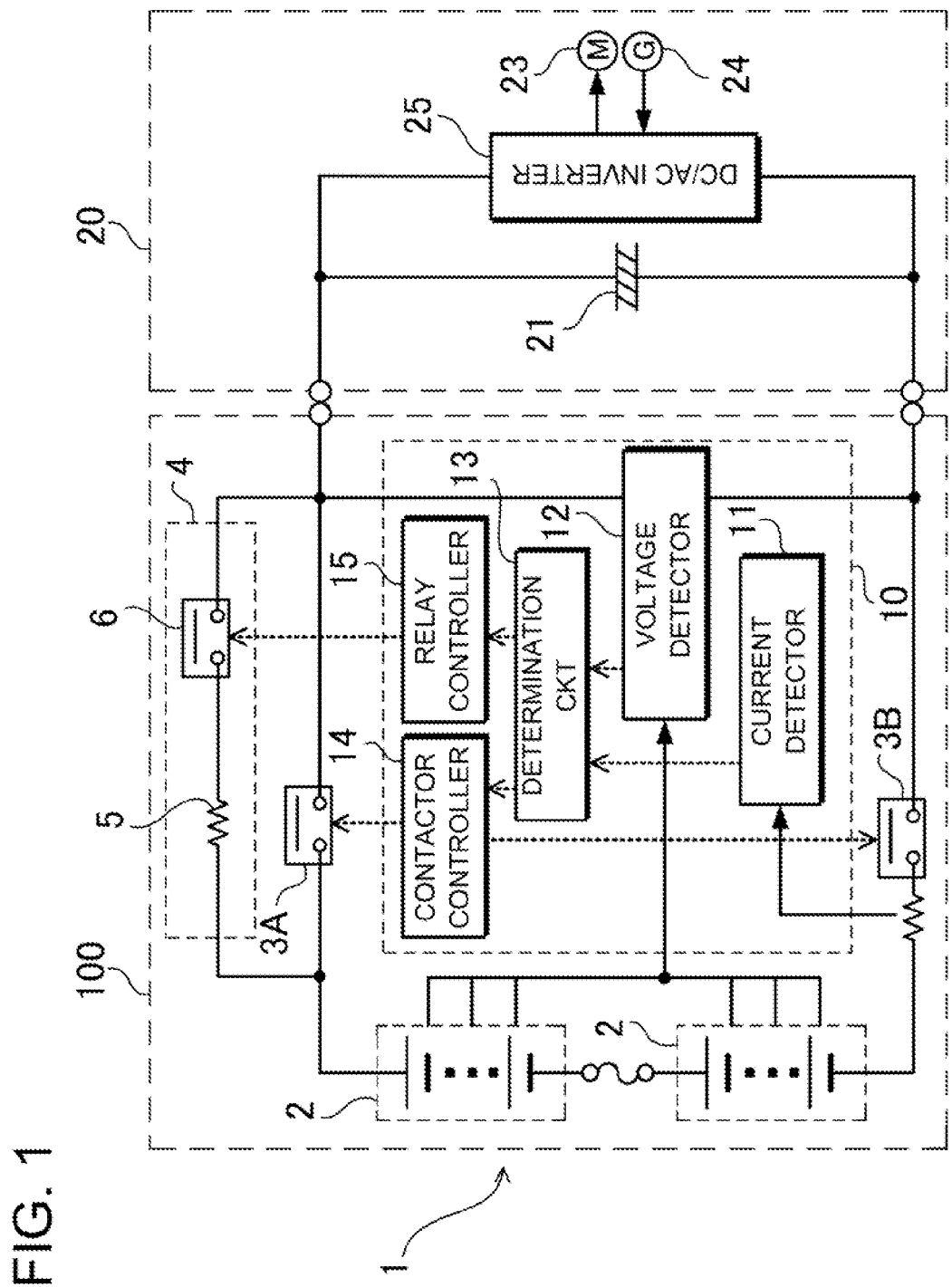
FIG. 1 is a block diagram showing a vehicle system that includes a power supply device according to one embodiment connected to a load.

FIG. 1 shows a vehicle system that includes a power supply device according to an embodiment connected to a vehicle-side load. The illustrated vehicle power supply device is installed a hybrid car, electric vehicle or fuel cell electric vehicle, and drives an electric motor 23 connected as load for running the vehicle. This vehicle power supply device 100 includes a driving battery 1 including a plurality of battery units 2 that are connected to each other in series, a positive terminal contactor 3A that is serially connected to the positive side of the driving battery 1 and supplies electric power to the vehicle-side load 20, a negative terminal contactor 3B that is serially connected to the negative side of the driving battery, a precharge circuit 4 that is connected in parallel to the positive terminal contactor 3A, and a control portion 10 that detects the voltage of the driving battery 1 and controls opening/closing of the contactor. The vehicle power supply device 100 is connected to the vehicle-side load 20, and drives the vehicle-side load 20.

The electric vehicle such as hybrid car and electric vehicle as the vehicle-side load 20 includes a large-capacitance vehicle-side capacitor 21, a DC/AC inverter 25 connected in parallel to the vehicle-side capacitor 21, the driving electric motor 23, and an electric generator 24. Among them, the driving electric motor 23 serves as main vehicle-side load. The vehicle-side capacitor 21 and the DC/AC inverter 25 are connected to the positive/negative output terminals of the vehicle power supply device 100. The DC/AC inverter 25 converts DC electric power supplied from the vehicle power supply device 100 into AC electric power to supply the converted electric power to the driving electric motor 23, and also converts AC electric power generated by the electric generator 24 into DC electric power to return the converted electric power to the vehicle power supply device 100 for recharging the driving battery 1.

In the vehicle-side load 20, the large-capacitance vehicle-side capacitor 21 is connected to the driving battery in parallel. This vehicle-side capacitor 21 supplies electric power to the driving battery 1 as well as the vehicle-side load 20 with contacts of contactors being closed. In particular, the vehicle-side capacitor 21 supplies a large momentary amount of electric power to the vehicle-side load 20. In the case where the vehicle-side capacitor 21 is connected in parallel to the driving battery 1, it is possible to increase the available momentary amount of electric power supplied to the vehicle-side load 20. The available amount of electric power supplied to the vehicle-side load 20 from the vehicle-side capacitor 21 is proportional to the capacitance of the vehicle-side capacitor 21. For this reason, a capacitor with very large capacitance (e.g., 4000 to 6000 μF) is used as the vehicle-side capacitor 21.

The driving battery 1 includes two battery units 2 that are serially connected to each other. Each of the battery units 2 includes a plurality of battery modules that are serially connected to each other. The battery module includes a plurality of rechargeable battery cells that are arranged side by side and are serially connected to each other. The rechargeable batteries are nickel-hydrogen batteries or lithium-ion rechargeable batteries. Specifically, the battery module includes five to six rechargeable batteries serially connected to each other. However, the battery module includes four or less, or seven or more rechargeable batteries serially connected to each other. In the driving battery 1 including two battery units 2, each of the battery units 2 includes seven to eight battery modules serially connected to each other.

To supply a large amount of electric power to the driving electric motor 23, the output voltage of the driving battery 1 can be set at a value of 200 to 400 V, for example. However, a DC/DC converter (not shown) can be connected to the output side of the driving battery in the vehicle power supply device to increase the voltage of the driving battery so that electric power with the increased voltage can be supplied to the vehicle-side load. In this vehicle power supply device, since the output voltage of the driving battery can be lower, the number of the serially-connected rechargeable batteries can be reduced. Accordingly, the output voltage of this driving battery can set at a value of 150 to 400V, for example.

It is noted that the vehicle power supply device does not necessarily include the battery units 2 composed of the battery modules. For example, each battery unit can be composed of serially-connected battery cells. In addition, the driving battery does not necessarily include the two battery units.

The amount of current supplied from the driving battery 1 can be detected by a current sensor (not shown) that is serially connected to the driving battery 1. Also, the voltage of each of battery unit 2 can be obtained by detecting the voltage between the both ends of the battery unit 2.

(Contactor)

The contactors are connected to the output sides of the vehicle power supply device 100. The contactor can be turned ON/OFF (closed/opened) by an ignition switch of the vehicle. When the ignition switch is turned ON, the contactor is also turned ON (closed) so that the vehicle power supply device 100 gets ready to supply electric power to the driving electric motor 23. When the ignition switch is turned OFF, the contactor is also turned OFF so that the output sides of the vehicle power supply device 100 are disconnected from the load. Accordingly, it is possible to prevent that the driving battery 1 is discharged and wastes electric power, and additionally to improve safety. In the exemplary circuit shown in FIG. 1, positive and negative terminal contactors 3A and 3B are provided as the contactors.

The positive terminal contactor 3A is connected between the positive terminal of the driving battery 1 and the positive output terminal. The negative terminal contactor 3B is connected between the negative terminal side of the driving battery 1 and the negative output terminal. Each of the positive and negative terminal contactors 3A and 3B has an exciting coil that controls ON/OFF of the contact of the contactor. The positive and negative terminal contactors 3A and 3B are relays that include the exciting coils for independently controlling ON/OFF of the contacts of the contactors. In the positive and negative terminal contactors 3A and 3B, the contact is turned ON when the exciting coil is energized, while the contact is turned OFF when the exciting coil is stopped being energized.

(Precharge Circuit 4)

The precharge circuit 4 is constructed of a series circuit of a precharge resistor 5 and a precharge relay 6. The precharge circuit 4 precharges the vehicle-side capacitor 21 when the ignition switch is turned ON (for example, when an ignition key is turned ON). Specifically, when the ignition switch is turned ON, while the positive terminal contactor 3A is held OFF, the negative terminal contactor 3B is brought into the closed state so that the vehicle-side capacitor 21 is precharged by the precharge circuit 4, which is connected to the positive terminal contactor 3A. After the vehicle-side capacitor 21 has been precharged, the positive terminal contactor 3A is switched from the opened state to the closed state so that the driving battery 1 is connected to the load 20. Subsequently, the precharge relay 6 of the precharge circuit 4 is turned OFF.

On the other hand, when the ignition switch of the vehicle is turned OFF, the exciting coils of the positive and negative terminal contactors 3A and 3B are de-energized. The positive and negative terminal contactors 3A and 3B with the exciting coils being de-energized are turned OFF if the positive and negative terminal contactors 3A and 3B properly operate.

When the ignition switch is turned OFF, the exciting coils of the positive and negative terminal contactors 3A and 3B are de-energized so that both the positive and negative terminal contactors 3A and 3B are brought into the OFF state by the control operation of the control portion 10. After that, the control portion 10 determines whether both the positive and negative terminal contactors 3A and 3B are actually properly brought into the OFF state.

(Control Portion 10)

The control portion 10 controls the opening/closing of the precharge relay 6, and the positive and negative terminal contactors 3A and 3B for the precharge operation. Also, the control portion detects and monitors the voltage of the driving battery 1. In addition, the control portion 10 also serves to determine whether the connected state of the vehicle-side load 20 is a connected state or a non-contact state. The control portion 10 shown in FIG. 1 includes a current detecting circuit 11 that detects the current flowing through the driving battery 1, a voltage detecting circuit 12 that detects the capacitor voltage of the vehicle-side capacitor 21 connected to the output sides of the positive terminal contactor 3A and the negative terminal contactor 3B, a determination circuit 13 that compares the capacitor voltage detected by the voltage detecting circuit 12 with a predetermined voltage and determines the connected state of the vehicle-side load 20, a contactor controlling portion 14 that controls the opening/closing of the negative contactor 3B, and a relay controlling circuit 15 that controls the precharge relay 6 of the precharge circuit 4. The thus-constructed control portion 10 can be incorporated in an engine control unit (ECU) on the power supply device 100, so-called battery ECU.

(Voltage Detecting Circuit 12)

The voltage detecting circuit 12 also serves as a circuit that detects the voltages of battery cells of the driving battery 1. That is, the voltage detecting circuit 12 detects the voltages of the battery modules or battery cells, which compose the driving battery 1, by switching the battery modules or battery cells by using a multiplexer, or the like. On the other hand, the voltage detecting circuit can also serve as a detecting portion for detecting the capacitor voltage of the output side (i.e., vehicle-side) of the capacitor 21. Accordingly, the required number of sensors can be reduced. Therefore, the circuit can be simplified and can be manufactured at low cost. That is, when the ignition key is turned ON, the contactor controlling circuit 14 closes the negative terminal contactor 3B so that the ground line is switched. Thus, the voltage detecting circuit 12 detects the capacitor voltage. Accordingly, the determination circuit 13 determines whether the vehicle-side load 20 is in the connected state or the non-contact state. Therefore, there is an advantage that the voltage detecting circuit 12 for battery cells can also serve to detect the connected state of the vehicle-side load 20.

It is noted that, in this specification, the detection voltage detected by the voltage detecting circuit 21 referred to as the capacitor voltage for convenience, however the capacitor voltage is not limited to the voltage of the vehicle-side capacitor 21. That is, the contactor voltage will be detected as the capacitor voltage if the vehicle-side load 20 is not connected.

(Precharge Operation)

Figure 2:
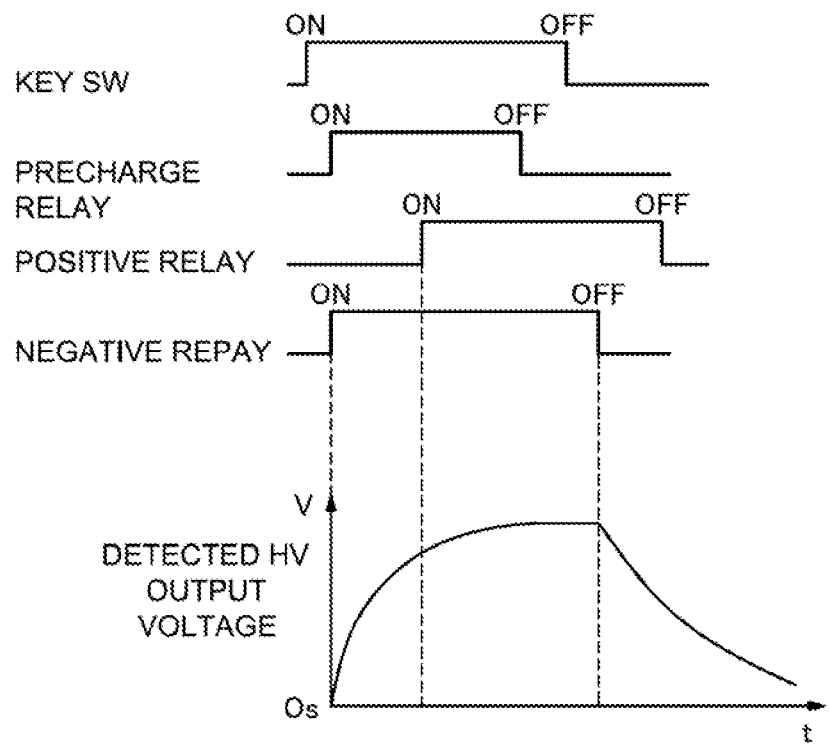
FIG. 2 is a timing chart showing precharge operation in the normal state.
Figure 3:
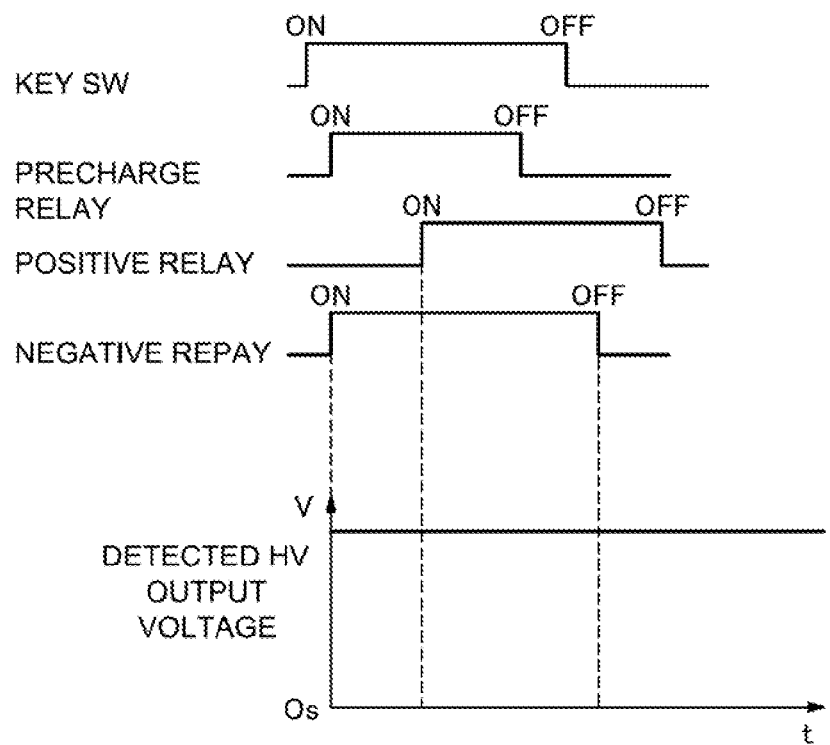
FIG. 3 is a timing chart showing precharge operation in a non-contact state where a high-voltage line is opened.
Figure 4:
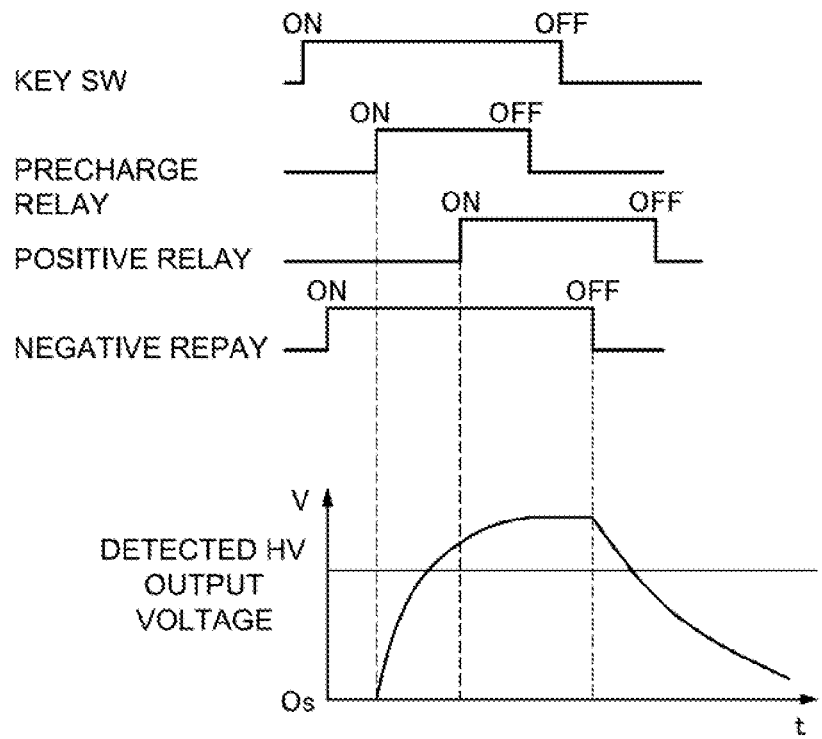
FIG. 4 is a timing chart showing precharge operation in a connected state according to the embodiment.
Figure 5:
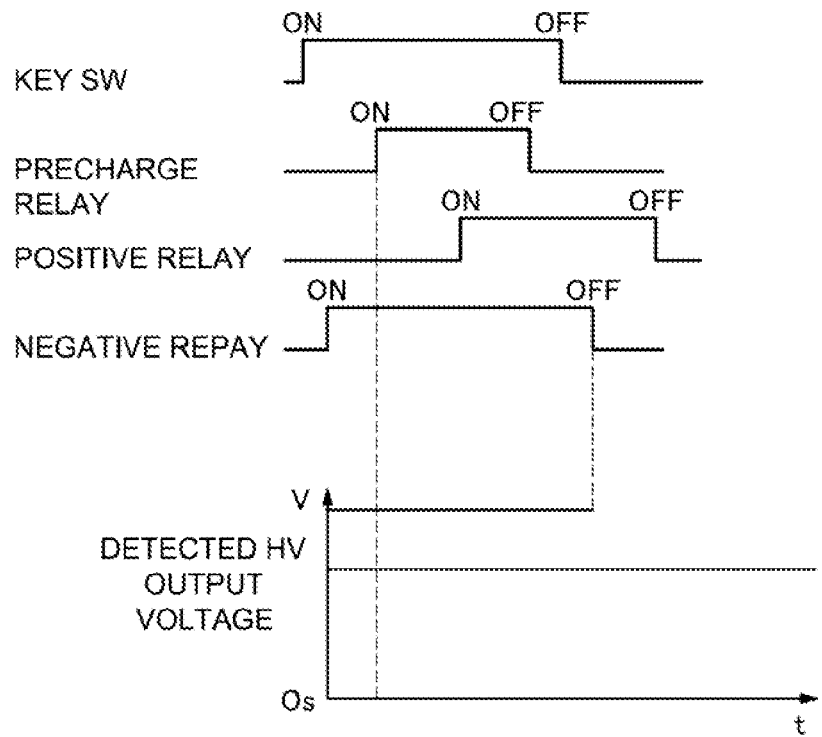
FIG. 5 is a timing chart showing precharge operation in a connected state with electric charge is still stored in a capacitor according to the embodiment.
Figure 6:
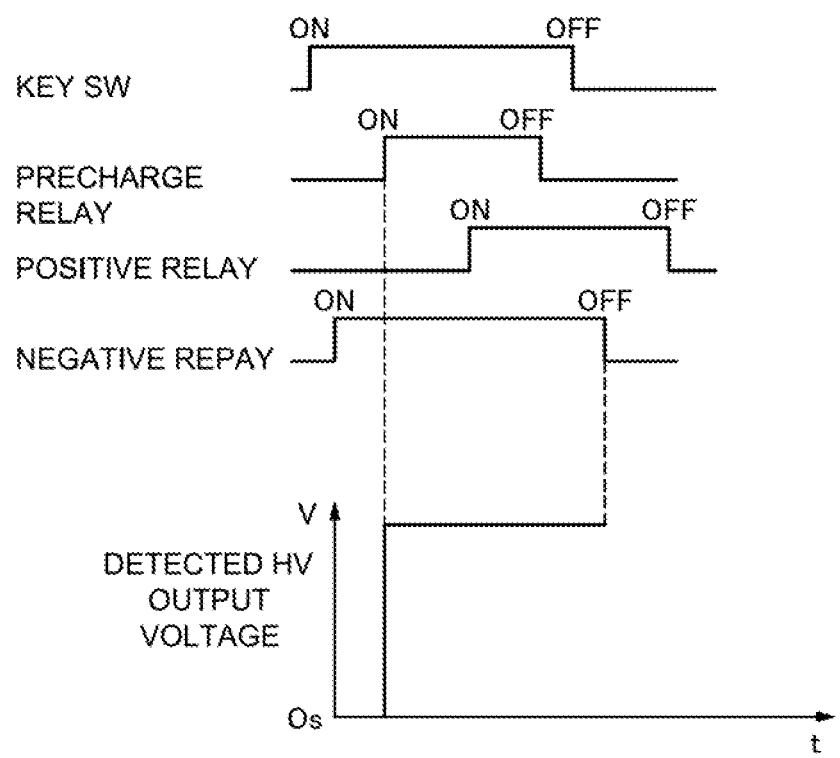
FIG. 6 is a timing chart showing precharge operation in the non-contact state according to the embodiment.

FIGS. 2 to 6 are timing charts of the precharge operation of the precharge circuit 4, the positive terminal, and the negative terminal contactor 3B. FIG. 2 is a timing chart showing conventional precharge operation in the normal state. FIG. 3 is a timing chart showing conventional precharge operation in a non-contact state where a high-voltage line is opened. FIG. 4 is a timing chart showing the precharge operation in the normal state according to this embodiment. FIG. 5 is a timing chart showing the precharge operation with electric charge being still stored in the vehicle-side capacitor 21. FIG. 6 is a timing chart showing the precharge operation in the non-contact state and the capacitor voltage detected by the voltage detecting circuit 12. As shown in FIGS. 2 and 3, normally, the negative terminal contactor 3B and the precharge relay 6 are simultaneously closed. In the connected state, that is, in the normal state, the vehicle-side capacitor 21 is charged by the driving battery 1. Accordingly, the voltage value of a high-voltage line detected by the voltage detecting circuit 12 (i.e., the capacitor voltage) gradually increases and approaches the battery voltage of the driving battery 1. Contrary to this, in the non-contact state, that is, in an abnormal state, since the circuit is opened, current does not flow through the vehicle-side capacitor 21 so that the voltage of the high-voltage line immediately increases to the battery voltage. The determination circuit 13 determines whether the connected state or the non-contact state based on the voltage increase difference.

(Determination Circuit 13)

As discussed above, the control portion 10 includes the determination circuit 13, which detects that the high-voltage line is opened by disconnection, poor contact or the like, in other words, that the vehicle power supply device 100 is not properly connected to the vehicle-side load 20. This determination circuit 13 performs the determining operation at ignition key start, in other words, when the ignition key is turned ON. Although the abnormal state such as disconnection can be determined based on the capacitor voltage as discussed above, a capacitor voltage value is produced if electric charge is still stored in the vehicle-side capacitor 21. For this reason, it is necessary to distinguish the capacitor voltage produced by the electric charge stored in the vehicle-side capacitor 21 from the capacitor voltage produced by the abnormal state. For example, in the case of a vehicle where, after the ignition key is turned OFF, the vehicle-side capacitor 21 spontaneously discharges the electric charge, the vehicle-side capacitor 21 will keep its capacitor voltage value high. On the other hand, some vehicles forcedly discharge the vehicle-side capacitor 21 after the ignition key is turned OFF. For this reason, the increasing degree of capacitor voltage is monitored in this embodiment. Specifically, the time rate of the increase of capacitor voltage is measured to detect the normal state if the rate falls within a predetermined range and detect the abnormal state if the rate falls out of the predetermined range.

Figure 7:
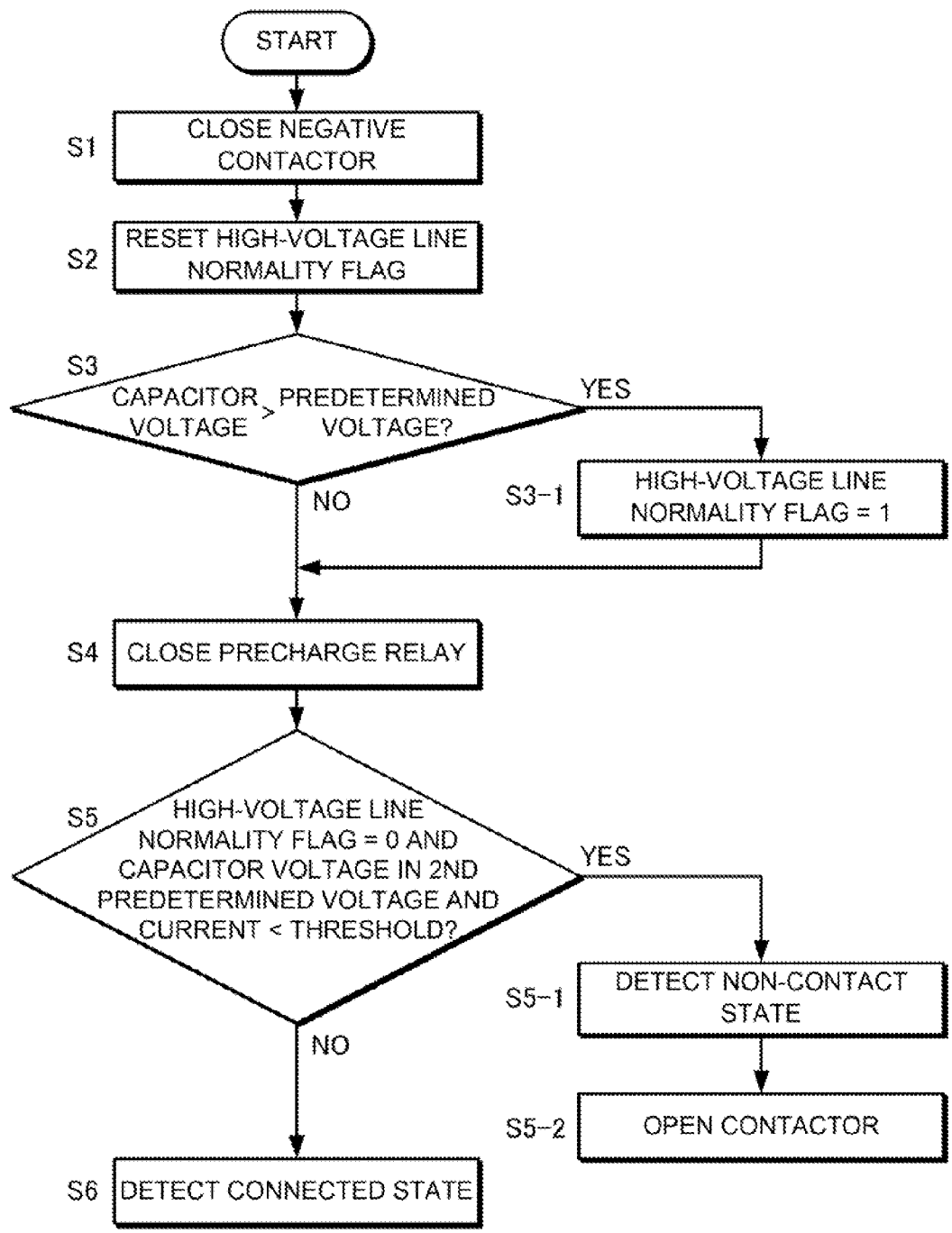
FIG. 7 is a flowchart showing the procedure of determining whether the load is in the connected state or the non-contact state.

The following description will describe the procedure where the determination circuit 13 determines whether the vehicle-side load 20 connected to the vehicle power supply device is in the connected state or in the non-contact state at the ignition key start with reference to voltage waveforms in FIGS. 4 and 5, and a flowchart of FIG. 7. In Step S1, the negative terminal contactor 3B is first closed by the contactor controlling circuit 14. Subsequently, in Step S2, a high-voltage line normality flag is reset that indicates that the high-voltage line is in the normal state. In this step, the high-voltage line normality flag is reset to 0 (zero). Subsequently, in Step S3, the voltage detecting circuit 12 detects the capacitor voltage, and compares the detected capacitor voltage with the predetermined voltage. The predetermined voltage is a threshold voltage value for determining whether the electric charge is still stored in the vehicle-side capacitor 21. The predetermined voltage can be set at an arbitrary value, e.g., a value in the range of 10% to 80%. In the case of FIG. 7, the predetermined voltage is set at 50% of the battery voltage (BV/2). In Step S3, the determination circuit 13 determines whether the capacitor voltage CV is larger than 50% of the battery voltage BV. If the capacitor voltage CV is not larger than 50% of the battery voltage BV, the procedure goes to Step S4. On the other hand, if the capacitor voltage CV is larger than 50% of the battery voltage BV, the procedure goes to Step S3-1. In Step S3-1, the high-voltage line normality flag is set to 1 (one) for indicating the normal state. After that, the procedure goes to Step S4. In Step S3 both, the capacitor voltage is thus detected with both the positive and negative terminal contactors 3A and 3B being opened. Accordingly, it is determined whether electric charge is still stored in the vehicle-side capacitor 21. As shown in FIG. 5, if the capacitor voltage is detected, it is determined that the vehicle-side load 20 is connected. At this time, the connected state is confirmed. Accordingly, the voltage line normality flag can be set at 1 (one).

On the other hand, if the capacitor voltage is not detected, it can be considered that the high-voltage line is properly connected (in the normal condition) but the vehicle-side capacitor 21 does not sufficiently store electric charge after being discharged (FIG. 4), or that the high-voltage line is disconnected (FIG. 6). At this time, it cannot be determined whether the high-voltage line is properly connected or disconnected. For this reason, in the following steps, it is determined whether the high-voltage line is properly connected or disconnected. Specifically, in Step S4, the precharge relay 6 is closed by the relay controlling circuit 15 so that the procedure performs the precharge operation. Subsequently, in Step S5, non-contact state determining operation is performed where the determination circuit 13 determines whether the increase of the capacitor voltage agrees with non-contact state determining conditions. In the determination the increase of the capacitor voltage agrees with non-contact state determining conditions, the capacitor voltage is detected again by the voltage detecting circuit 12 so that the detected capacitor voltage is compared with a second predetermined voltage. A range of 100%±20% (i.e., 80% to 120%) of the battery voltage BV is employed as the second predetermined voltage. Thus, if (capacitor voltage CV)/(battery voltage BV) falls within the range of 100%±20%, the non-contact state is detected. In the case where the range as said second predetermined voltage has upper and lower limit values, even if the voltage detecting circuit malfunctions, it can be determined that the detected value overflows. As a result, it is possible prevent that it is wrongly detected that the detected capacitor voltage reaches the full range.

Also, it is preferable that a current value be additionally included in the non-contact state determining conditions. Current does not flow in the non-contact state. For this reason, when a current value detected by the current detecting circuit 11 is compared with a threshold current value, if the current value is lower than the threshold current value, the non-contact state can be detected. The current value can be set at 1.5 A.

In the exemplary flowchart shown in FIG. 7, it is determined whether all the following conditions are satisfied as the non-contact state determination conditions. In the first condition, it is determined whether the high-voltage line normality flag is 0 (zero). In the second condition, it is determined whether the capacitor voltage falls within the predetermined range. In the third condition, it is determined whether the current value detected by the current detecting circuit 11 is lower than the predetermined current threshold value. In the case of the non-contact state where disconnection or the like occurs, the current does not flow into the vehicle-side capacitor 21. Accordingly, the capacitor voltage immediately sharply increases, and the current does not flow. As a result, the current value is low. In this case, in order to properly detect the non-contact state, the non-contact state is detected if all the above three conditions are satisfied.

In addition, in order to prevent false detection, it is preferable that a plurality of non-contact state determining operations be performed periodically at a predetermined period of time. In this case, if the non-contact state is detected continuously for a predetermined number of times, it is concluded that the non-contact state is detected. In this embodiment, the non-contact state determining operations is performed periodically at an interval of 10 ms. If the non-contact state is detected continuously for five times, the procedure goes to Step S5-1. In Step S5-1, the determination circuit 13 concludes the non-contact state, and confirms high-voltage line error. Subsequently, the procedure goes to Step S5-2 where the contactor is turned OFF.

On the other hand, if the non-contact state determining conditions are not satisfied in Step 5, the procedure goes to Step S6 where the determination circuit 13 detects the connected state. Thus, the precharge operation is continued. That is, predetermined processes of precharge operation are sequentially performed such as process for closing the positive terminal contactor 3A, and process for turning the precharge relay 6 OFF.

As discussed above, in this embodiment, the negative terminal contactor 3B and the precharge relay 6 are not simultaneously closed, but as shown in the timing charts of FIGS. 4 to 6, after the negative terminal contactor 3B is closed, the precharge relay 6 is closed at delayed timing. Accordingly, it is possible distinguish the capacitor voltage produced by electric charge stored in the vehicle-side capacitor 21 from the capacitor voltage caused by the non-contact state. That is, in the case of the non-contact state, as shown in FIG. 6, when both the negative terminal contactor 3B and the precharge relay 6 are closed, the battery voltage of the driving battery 1 will be detected by the voltage detecting circuit 12. On the other hand, in the case where the electric charge is still stored in the vehicle-side capacitor 21, as shown in FIG. 5, when the negative terminal contactor 3B is connected, even if the precharge relay 6 is not closed, the capacitor voltage of the vehicle-side capacitor 21 can be detected by the voltage detecting circuit 12. Since the negative terminal contactor 3B and the precharge relay 6 are closed at different timing, it is possible distinguish the capacitor voltage produced by electric charge stored in the vehicle-side capacitor from the capacitor voltage caused by the non-contact state. Therefore, it is possible to properly detect the non-contact state. It is noted that it is enough for the delayed time of the precharge relay 6 closing from the negative terminal contactor 3B closing to allow the voltage detecting circuit 12 to detect the voltage. For example, the delayed time can be set at arbitrary time, e.g., a value in the range of 5 to 50 ms.

As discussed above, without using a specifically-designed member such as connector having a connection detecting plug, the determination circuit 13 can detect the connected state of the vehicle-side load 20 by using the voltage detecting circuit 12 and the current detecting circuit 11, which are existing circuits. As a result, the vehicle power supply device can be directly fastened to the vehicle-side load by screws and the like without using a complicated connector having an interlock mechanism. Therefore, there is an advantage that the vehicle power supply device can be simply connected to the vehicle-side load. In addition, in the case where voltage variation is monitored at the beginning of precharge operation, it is possible to quickly and properly detect the connected state.

It is noted that, although the negative terminal contactor 3B is closed when the capacitor voltage is detected in the aforementioned precharge operation, in the case where the negative connection line of the voltage detecting circuit 12 is connected to the negative terminal of the driving battery 1, the closing operation of the negative terminal contactor 3B can be eliminated. In addition, although the contactors are arranged on the positive and negative terminal sides in the foregoing embodiment, the present invention is not limited to this construction. The contactor may be provided only on the positive or negative terminal side.

As discussed above, the vehicle power supply device can be used as a battery system for vehicles. The power supply device can be installed on electric vehicles such as hybrid cars that are driven by both an engine and a motor, and electric vehicles that are driven only by a motor. The power supply device can be used as a power supply device for these types of vehicles.

Figure 8:
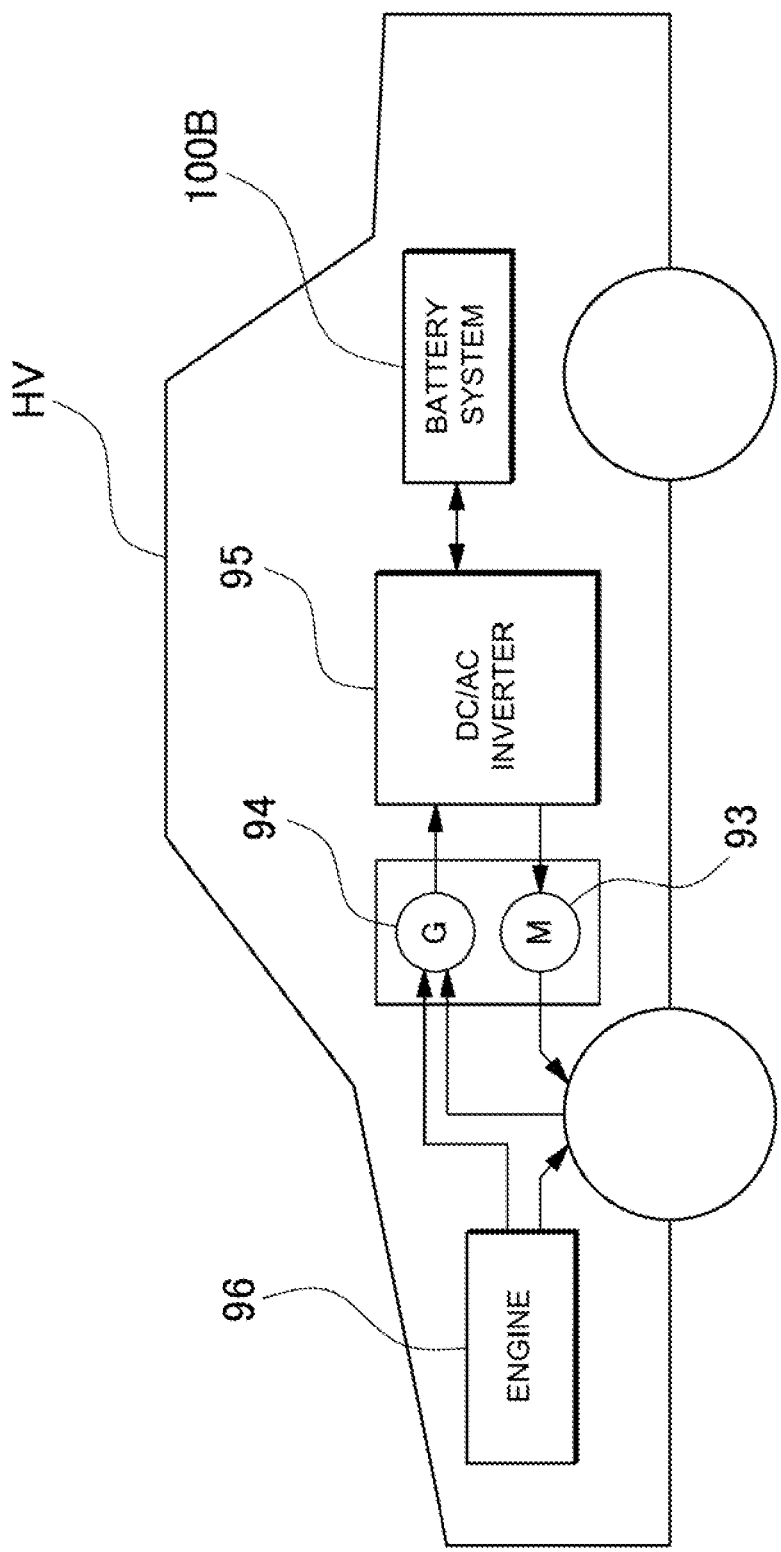
FIG. 8 is a block diagram showing an exemplary hybrid car that is driven by an engine and an electric motor, and includes the power supply device.

FIG. 8 is a block diagram showing an exemplary hybrid car that is driven both by an engine and an electric motor, and includes the power supply device. The illustrated vehicle HV with the power supply device includes an electric motor 93 and an engine 96 that drive the vehicle HV, a battery system 100B that supplies electric power to the electric motor 93, and an electric generator 94 that charges batteries of the battery system 100B. The battery system 100B is connected to the electric motor 93 and the electric generator 94 via a DC/AC inverter 95. The vehicle HV is driven both by the electric motor 93 and the engine 96 with the batteries of the battery system 100B being charged/discharged. The electric motor 93 is energized with electric power and drives the vehicle in a poor engine efficiency range, e.g., in acceleration or in a low speed range. The electric motor 93 is energized by electric power is supplied from the battery system 100B. The electric generator 94 is driven by the engine 96 or by regenerative braking when users brake the vehicle so that the batteries of the battery system 100B are charged.

Figure 9:
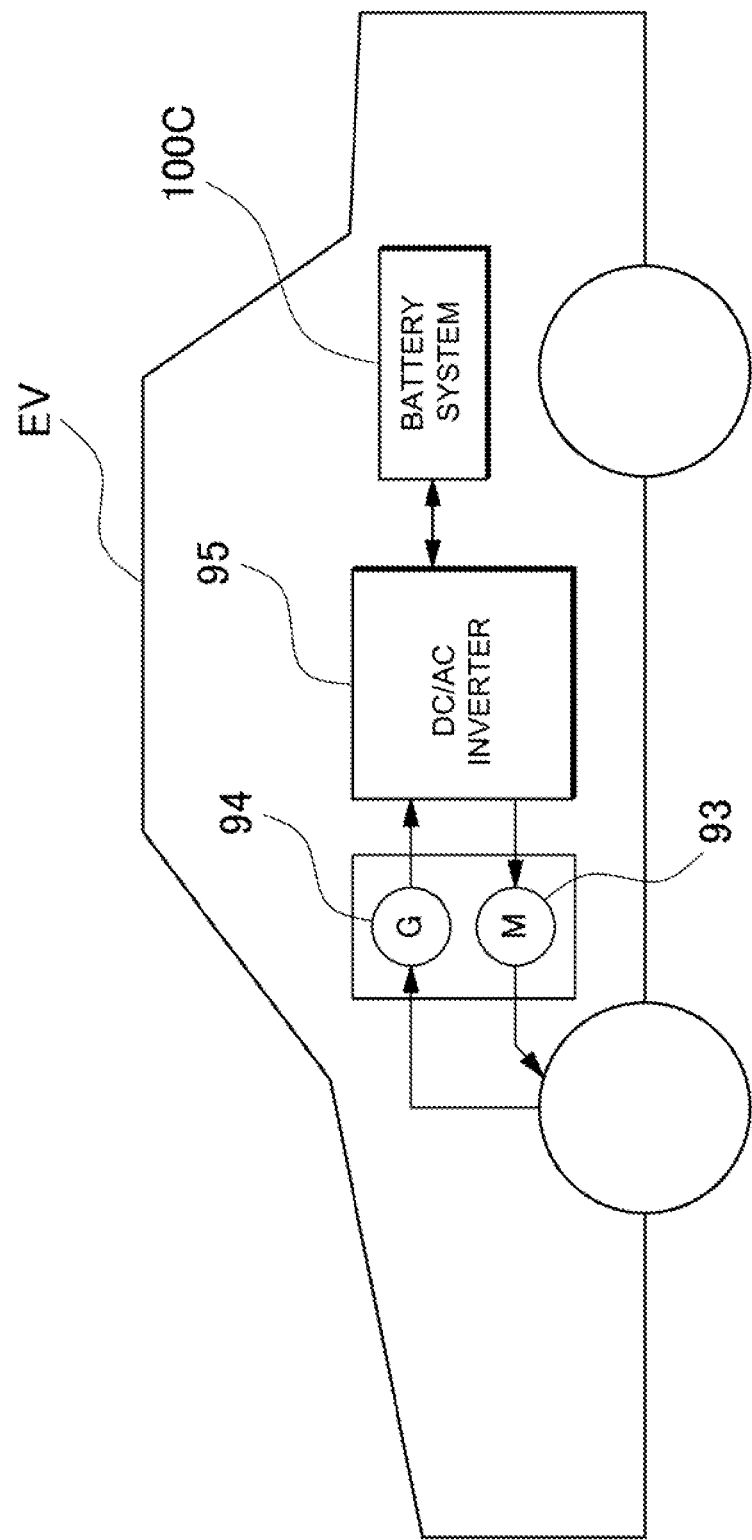
FIG. 9 is a block diagram showing an exemplary electric vehicle that is driven only by an electric motor, and includes the power supply device.

FIG. 9 shows an exemplary electric vehicle that is driven only by an electric motor, and includes the power supply device. The illustrated vehicle EV with the power supply device includes an electric motor 93 that drives the vehicle EV, a battery system 100C that supplies electric power to the electric motor 93, and an electric generator 94 that charges batteries of the battery system 100C. The electric motor 93 is energized by electric power that is supplied from the battery system 100C. The electric generator 94 can be driven by vehicle EV regenerative braking so that the batteries of the battery system 100C are charged.

(Power Storage Type Power Supply Device)

Figure 10:
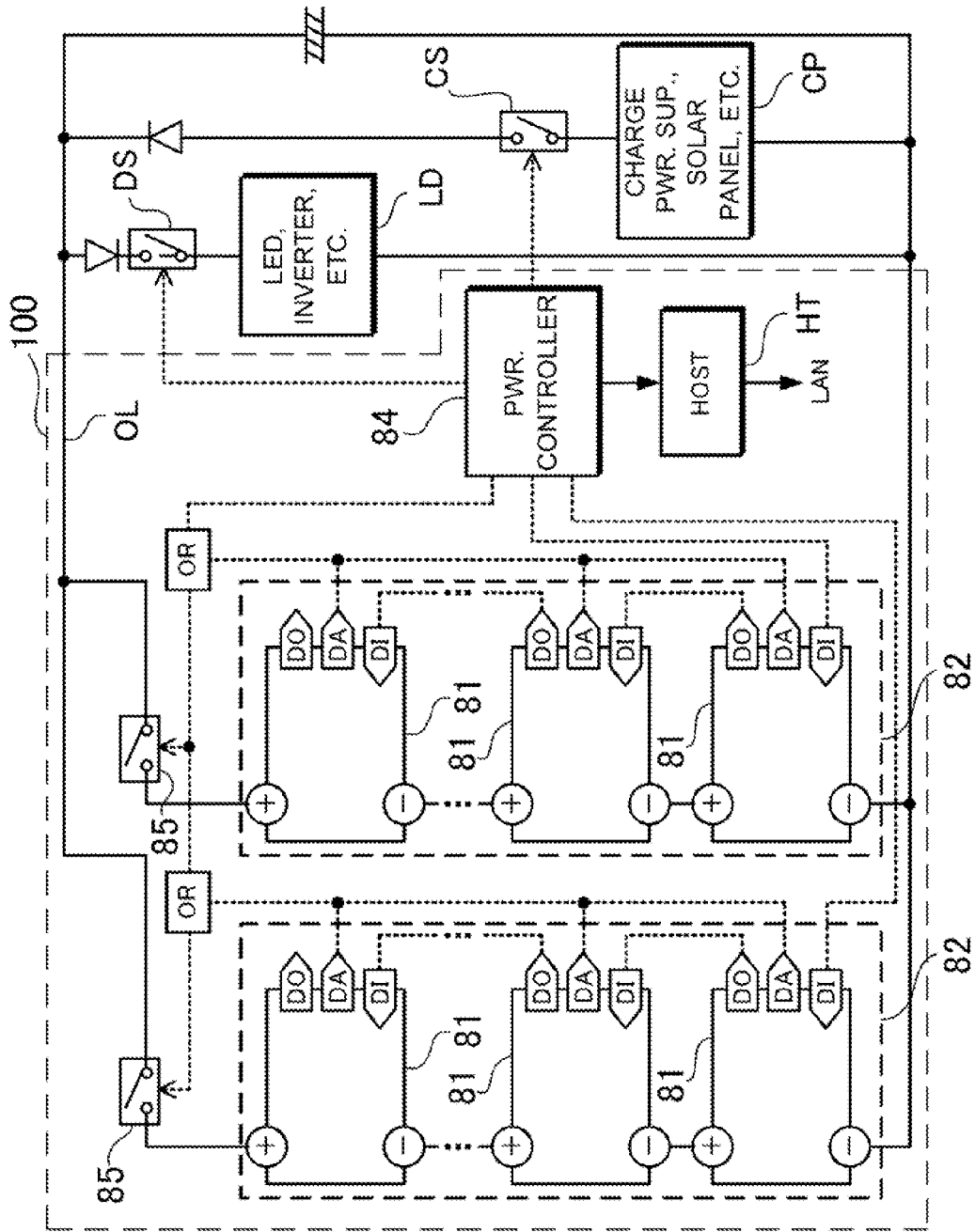
FIG. 10 is a block diagram a power storage type power supply device to which the present invention is applied.

The power supply device can be used not only as power supply of mobile unit such as vehicle but also as stationary power storage. For example, examples of stationary power storage devices can be provided by an electric power system for home use or plant use that is charged with solar electric power or with midnight electric power and is discharged when necessary, a power supply for street lights that is charged with solar electric power during the daytime and is discharged during the nighttime, or a backup power supply for signal lights that drives signal lights in the event of a power failure. FIG. 10 shows a circuit diagram according to this embodiment. This illustrated power supply device 100 includes battery units 82 each of which includes a plurality of battery packs 81 that are connected to each other. In each of battery packs 81, a plurality of battery cells are connected to each other in serial and/or in parallel. The battery packs 81 are controlled by a power supply controller 84. In this power supply device 100, after the battery units 82 are charged by a charging power supply CP, the power supply device 100 drives a load LD. The power supply device 100 has a charging mode and a discharging mode. The Load LD and the charging power supply CP are connected to the power supply device 100 through a discharging switch DS and a charging switch CS, respectively. The discharging switch DS and the charging operation switch CS are turned ON/OFF by the power supply controller 84 of the power supply device 100. In the charging mode, the power supply controller 84 turns charging operation switch CS ON, and turns the discharging switch DS OFF so that the power supply device 100 can be charged by the charging power supply CP. When the charging operation is completed so that the battery units are fully charged or when the battery units are charged to a capacity not lower than a predetermined value, if the load LD requests electric power, the power supply controller 84 turns the charging operation switch CS OFF, and turns the discharging switch DS ON. Thus, operation is switched from the charging mode to the discharging mode so that the power supply device 100 can be discharged to supply power to the load LD. In addition, if necessary, the charging operation switch CS may be turned ON, while the discharging switch DS may be turned ON so that the load LD can be supplied with electric power while the power supply device 100 can be charged.

The load LD driven by the power supply device 100 is connected to the power supply device 100 through the discharging switch DS. In the discharging mode of the power supply device 100, the power supply controller 84 turns the discharging switch DS ON so that the power supply device 100 is connected to the load LD. Thus, the load LD is driven with electric power from the power supply device 100. Switching elements such as FET can be used as the discharging switch DS. The discharging switch DS is turned ON/OFF by the power supply controller 84 of the power supply device 100. The power supply controller 84 includes a communication interface for communicating with an external device. In the power supply device according to the embodiment shown in FIG. 10, the power supply controller is connected to a host device HT based on existing communications protocols such as UART and RS-232C. Also, the power supply device may include a user interface that allows users to operate the electric power system if necessary.

Each of the battery packs 81 includes signal terminals and power supply terminals. The signal terminals include a pack input/output terminal DI, a pack abnormality output terminal DA, and a pack connection terminal DO. The pack input/output terminal DI serves as a terminal for providing/receiving signals to/from other battery packs and the power supply controller 84. The pack connection terminal DO serves as a terminal for providing/receiving signals to/from other battery packs as slave packs. The pack abnormality output terminal DA serves as a terminal for providing an abnormality signal of the battery pack to the outside. Also, the power supply terminal is a terminal for connecting one of the battery packs 81 to another battery pack in series or in parallel. In addition, the battery units 82 are connected to an output line OL through parallel connection switched 85, and are connected in parallel to each other.

A power supply device and a method for detecting the non-contact state of a load connected to a power supply device according to the present invention can be suitably applied to power supple devices of plug-in hybrid vehicles and hybrid electric vehicles that can switch between the EV drive mode and the HEV drive mode, electric vehicles, and the like.

It should be apparent to those with an ordinary skill in the art that while various preferred embodiments of the invention have been shown and described, it is contemplated that the invention is not limited to the particular embodiments disclosed, which are deemed to be merely illustrative of the inventive concepts and should not be interpreted as limiting the scope of the invention, and which are suitable for all modifications and changes falling within the scope of the invention as defined in the appended claims. The present application is based on Application No. 2010-043132 filed in Japan on Feb. 26, 2010, the content of which is incorporated herein by reference.

What is claimed is:

1. A power supply device, comprising:
a battery that includes rechargeable battery cells and supplies electric power to a load;

a positive terminal contactor that is serially connected to a positive side of the battery;

a negative terminal contactor that is serially connected to a negative side of the battery; and a control portion that determines whether the load is electrically in a connected state or a non-contact state to output sides of the positive terminal contactor and the negative terminal contactor, wherein the control portion comprises:

a voltage detecting circuit that detects a capacitor voltage of a capacitor of the load, the voltage detecting circuit being connected to the capacitor at the output sides of the positive terminal contactor and the negative terminal contactor, a contactor controlling circuit that controls opening and closing of the positive terminal contactor and the negative terminal contactor, respectively, and a determination circuit that compares the capacitor voltage detected by the voltage detecting circuit with a first predetermined voltage to determine the connected state of the load to the power supply device, wherein the voltage detecting circuit is configured to detect the capacitor voltage with the negative terminal contractor being controlled in a closed state and the positive terminal contactor being controlled in an open state by the contactor controlling circuit at a time a start switch is turned ON, and the determination circuit is configured to determine that the load is in a normal connected state to the power supply device when the capacitor voltage is not smaller than the first predetermined voltage.

2. The power supply device according to claim 1, wherein the first predetermined voltage is a voltage value not less than 50% of the battery voltage of the battery.

3. The power supply device according to claim 1 further comprising a precharge circuit that is connected in parallel to the positive terminal contactor and includes a series circuit of a precharge resistance and a precharge relay, wherein the control portion includes a relay controlling circuit that controls the precharge relay of the precharge circuit, wherein when the capacitor voltage is smaller then the first predetermined voltage, the determination circuit is configured to determine whether the load is in the connected state or the non-contact state based on an increasing rate of the capacitor voltage with time, the increasing rate of the capacitor voltage being detected by the voltage detecting circuit under a condition that the precharge relay is turned to a closed state from an open state by the relay controlling circuit a predetermined delay of time after the negative terminal contactor is controlled in closed state at the time the start switch is turned ON.

4. The power supply device according to claim 3 further comprising a current detecting circuit that detects current flowing through the battery, wherein when the current detected by the current detecting circuit is not greater than a predetermined threshold current, the determination circuit determines that the load is in the non-contact state.

5. The power supply device according to claim 4, wherein the determination circuit conducts a plurality of determination operations for determining whether the load is in the connected state or the non-contact state periodically at a predetermined period of time, wherein if it is determined continuously for a predetermined number of times that the load is in the non-contact state it is concluded that the load is in the non-contact state.

6. The power supply device according to claim 3, wherein the voltage detecting circuit detects the capacitor voltage when a predetermined period of time has elapsed after the precharge relay is turned ON, wherein the determination circuit compares the capacitor voltage detected by the voltage detecting circuit with a second predetermined voltage and determines whether the load is in the connected state or the non-contact state.

7. The power supply device according to claim 6, wherein the second predetermined voltage corresponds to a range from 80% to 120% of the battery voltage, and when the capacitor voltage detected by the voltage detecting circuit is within the range of the second predetermined voltage the determination circuit determines that the load is in the non-contact state to the power supply device.

8. The power supply device according to claim 7, wherein the capacitor voltage detected by the voltage detecting circuit is substantially equal to a voltage of the battery.

9. The power supply device according to claim 1, wherein the voltage detecting circuit also serves as a circuit that detects the voltages of battery cells of the battery.

10. The power supply device according to claim 6, wherein the determination circuit is configured to determine the load is in the connected state to the power supply device when the capacitor voltage detected by the voltage detecting circuit is less than the second predetermined voltage.

* * * * *